(12) United States Patent
Judkins et al.

(10) Patent No.: US 12,505,405 B2
(45) Date of Patent: Dec. 23, 2025

(54) SYSTEMS AND METHODS FOR MACHINE-LEARNING OPTIMIZATION FOR ESTIMATED TIME OF ARRIVAL ANALYSIS

(71) Applicant: Radius Networks, Inc., Washington, DC (US)

(72) Inventors: Timothy Judkins, Vienna, VA (US); Scott Newman, Aurora, CO (US); Christopher Sexton, McLean, VA (US); James Nebeker, Catonsville, MD (US); David Helms, Arlington, VA (US); Marc Wallace, Arlington, VA (US)

(73) Assignee: Radius Networks, Inc., Washington, DC (US)

( * ) Notice: Subject to any disclaimer, the term of this patent is extended or adjusted under 35 U.S.C. 154(b) by 0 days.

(21) Appl. No.: 18/497,486

(22) Filed: Oct. 30, 2023

(65) Prior Publication Data

US 2025/0139570 A1   May 1, 2025

(51) Int. Cl.
G06Q 10/0836   (2023.01)

(52) U.S. Cl.
CPC ............... *G06Q 10/0836* (2013.01)

(58) Field of Classification Search
CPC .................................. G06Q 10/0836
USPC ....................................... 705/339
See application file for complete search history.

(56) References Cited

U.S. PATENT DOCUMENTS

| | | |
|---|---|---|
| 9,582,797 B1 | 2/2017 | Holmes et al. |
| 9,772,193 B1 | 9/2017 | Mendelson |
| 9,952,049 B2 | 4/2018 | Zhang et al. |
| 10,921,147 B1 | 2/2021 | Hapgood et al. |
| 2008/0280624 A1 | 11/2008 | Wrappe |
| 2010/0324959 A1 | 12/2010 | Templeton et al. |

(Continued)

FOREIGN PATENT DOCUMENTS

| | | | |
|---|---|---|---|
| WO | WO2006126996 A1 | 11/2006 | |
| WO | WO2012135143 A2 | 10/2012 | |
| WO | WO-2022272242 A1 * | 12/2022 | ............. A47F 10/06 |

OTHER PUBLICATIONS

Hu. Xinyu et al., "DeeprETA: An ETA Post-processing System at Scale," Jun. 5, 2022, Uber Technologies Inc., pp. 1-9. https://arxiv.org/pdf/2206.02127. (Year: 2022).*

(Continued)

*Primary Examiner* — Jeff Zimmerman
*Assistant Examiner* — Hunter Molnar
(74) *Attorney, Agent, or Firm* — Lee & Hayes, P.C.

(57) ABSTRACT

Techniques for determining an estimated time of arrival associated with a pickup location are described herein. For example, a customer can order a good or service for pickup at a pickup location. In some examples, order data can include a pickup location intent, such as a drive-through location, a pickup window, or a parking location. A location of a user computing device can be determined and can be input to a machine-learning model trained to determine estimated times of arrival for a particular location. In some examples, the machine-learning model can be trained with ground truth data specific to the location for which the model is to determine estimated times of arrival. The machine-learning model can output the estimated time of arrival and can update the time at any regular or irregular intervals, which can be used to prioritize an order in an order queue.

20 Claims, 4 Drawing Sheets

(56) References Cited

U.S. PATENT DOCUMENTS

| | | | |
|---|---|---|---|
| 2013/0069823 | A1 | 3/2013 | van Diggelen |
| 2013/0132231 | A1 | 5/2013 | Teudt |
| 2013/0346237 | A1 | 12/2013 | Rademaker |
| 2014/0180959 | A1 | 6/2014 | Gillen |
| 2014/0222570 | A1 | 8/2014 | Devolites |
| 2014/0279294 | A1 | 9/2014 | Field-Darragh et al. |
| 2015/0081362 | A1 | 3/2015 | Chadwick et al. |
| 2015/0120514 | A1 | 4/2015 | Deshpande et al. |
| 2015/0227890 | A1 | 8/2015 | Bednarek et al. |
| 2015/0302495 | A1 | 10/2015 | Stuckman et al. |
| 2015/0359127 | A1 | 12/2015 | Daoura et al. |
| 2016/0063435 | A1 | 3/2016 | Shah et al. |
| 2016/0068264 | A1 | 3/2016 | Ganesh et al. |
| 2016/0078397 | A1 | 3/2016 | Barton et al. |
| 2016/0092943 | A1 | 3/2016 | Vigier et al. |
| 2019/0297243 | A1 | 9/2019 | Oshima |
| 2019/0385121 | A1 | 12/2019 | Waliany et al. |
| 2020/0160268 | A1 | 5/2020 | Han |
| 2020/0167722 | A1* | 5/2020 | Goldberg ............... G08G 5/003 |
| 2020/0242553 | A1* | 7/2020 | Zhang ................... H04W 4/025 |
| 2020/0250737 | A1* | 8/2020 | Wallace ............. G06Q 30/0639 |
| 2020/0327492 | A1 | 10/2020 | Weiby |
| 2021/0065107 | A1* | 3/2021 | Jajula ................... G06Q 10/087 |
| 2021/0089995 | A1 | 3/2021 | Iacono |
| 2021/0216959 | A1* | 7/2021 | Hapgood ............. H04W 4/021 |
| 2021/0364651 | A1 | 11/2021 | Helms et al. |
| 2022/0051183 | A1* | 2/2022 | Franzo ............. G06Q 10/06398 |
| 2024/0012159 | A1 | 1/2024 | Helms |
| 2025/0209412 | A1* | 6/2025 | Rademaker ........ G06Q 30/0635 |

OTHER PUBLICATIONS

Bhattacharya, Wrishin, "Expected Time of Arrival Predictor," Apr. 9, 2023, LinkedIn, pp. 1-6. https://www.linkedin.com/pulse/expected-time-arrival-predictor-wrishin-bhattacharya#:~:text=Machine%20Learning%20Models%20for%20ETA,%2C%20traffic%2C%20and%20weather%20conditions. (Year: 2023).*

Office Action for U.S. Appl. No. 15/051,516, Mailed on Feb. 24, 2021 Rademaker, William B. "Systems and Methods for Servicing Curb-Side Deliveries" 25 pages.

PCT Search Report and Written Opinion mailed Aug. 24, 2021 for PCT Application No. PCT/US21/33175, 12 pages.

Office Action for U.S. Appl. No. 15/051,516, mailed on Apr. 12, 2022, Rademaker, "Systems and Methods for Servicing Curb-Side Deliveries", 28 Pages.

Office Action for U.S. Appl. No. 15/051,516, Mailed on Jun. 8, 2021 Rademaker, William B. "Systems and Methods for Servicing Curb-Side Deliveries" 28 pages.

Office Action for U.S. Appl. No. 15/051,516, mailed on Jul. 20, 2023, Rademaker, "Systems and Methods for Servicing Curb-Side Deliveries", 30 Pages.

Office Action for U.S. Appl. No. 15/051,516, mailed on Aug. 10, 2022, Rademaker, "Systems and Methods for Servicing Curb-Side Deliveries", 28 Pages.

Office Action for U.S. Appl. No. 15/051,516, mailed on Dec. 21, 2022, Rademaker, "Systems and Methods for Servicing Curb-Side Deliveries", 27 Pages.

Office Action for U.S. Appl. No. 15/051,516, Mailed on Feb. 20, 2019 Rademaker, William B. "Systems and Methods for Servicing Curb-Side Deliveries" 27 pages.

Office Action for U.S. Appl. No. 16/879,537, mailed on Feb. 13, 2023, Inventor #1 David Helms, "GPS Based Location Determination Using Accurately Mapped Polygonal Areas", 16 pages.

Steinfield, et al., "Integrating Brick and Mortar Locations with E-Commerce: Understanding Synergy Opportunities", 2002 Proceedings of the 35th Hawaii International Conference on System Sciences, Jan. 2002, 10 pgs.

Office Action for U.S. Appl. No. 15/051,516, mailed on Feb. 9, 2024, Rademaker, "Systems and Methods for Servicing Curb-Side Deliveries", 33 Pages.

Office Action for U.S. Appl. No. 18/391,622, mailed on Feb. 23, 2024, Rademaker, "Systems and Methods for Servicing Curb-Side Deliveries", 20 pages.

Office Action for U.S. Appl. No. 18/391,622, mailed on Jun. 11, 2024, Rademaker, "Systems and Methods for Determining a Location of a Computing Device", 24 Pages.

Office Action for U.S. Appl. No. 18/391,622, mailed on Sep. 9, 2024, Rademaker, "Systems and Methods for Determining a Location of a Computing Device", 28 Pages.

Office Action for U.S. Appl. No. 18/391,622, dated Feb. 4, 2025, 27 Pages.

Search Report and Written Opinion for International Application No. PCT/US2024/053015, Dated Feb. 7, 2025, 14 pages.

Office Action for U.S. Appl. 18/350,156, dated Apr. 21, 2025, 17 Pages.

Office Action for U.S. Appl. No. 18/391,622, dated Jun. 11, 2025, 29 Pages.

* cited by examiner

400

```
┌─────────────────────────────────────────────────────────────────────────┐
│  RECEIVE, FROM A MERCHANT ASSOCIATED WITH A STORE, MAP DATA REPRESENTING A │
│                   POLYGONAL AREA PROXIMATE THE STORE                     │
│                                   402                                    │
└─────────────────────────────────────────────────────────────────────────┘
                                    ↓
┌─────────────────────────────────────────────────────────────────────────┐
│  RECEIVE A PICKUP ORDER ASSOCIATED WITH A CUSTOMER, THE PICKUP ORDER INDICATING AT │
│           LEAST ONE GOOD OR SERVICE AND A PICKUP LOCATION INTENT         │
│                                   404                                    │
└─────────────────────────────────────────────────────────────────────────┘
                                    ↓
┌─────────────────────────────────────────────────────────────────────────┐
│   ASSOCIATE THE PICKUP ORDER WITH A USER COMPUTING DEVICE ASSOCIATED WITH THE │
│                                 CUSTOMER                                 │
│                                   406                                    │
└─────────────────────────────────────────────────────────────────────────┘
                                    ↓
┌─────────────────────────────────────────────────────────────────────────┐
│              RECEIVE LOCATION DATA FROM THE USER COMPUTING DEVICE        │
│                                   408                                    │
└─────────────────────────────────────────────────────────────────────────┘
                                    ↓
┌─────────────────────────────────────────────────────────────────────────┐
│           DETERMINE ADDITIONAL DATA ASSOCIATED WITH THE USER COMPUTING DEVICE │
│                                   410                                    │
└─────────────────────────────────────────────────────────────────────────┘
                                    ↓
┌─────────────────────────────────────────────────────────────────────────┐
│ INPUT THE PICKUP ORDER, THE LOCATION DATA, AND THE ADDITIONAL DATA INTO A MACHINE- │
│ LEARNING MODEL TRAINED TO DETERMINE A PARTICULAR ESTIMATED TIME OF ARRIVAL OF A │
│                    CUSTOMER TO A LOCATION OF THE STORE                   │
│                                   412                                    │
└─────────────────────────────────────────────────────────────────────────┘
                                    ↓
┌─────────────────────────────────────────────────────────────────────────┐
│ RECEIVE, FROM THE MACHINE-LEARNING MODEL AND BASED AT LEAST IN PART ON THE PICK UP │
│  ORDER, THE LOCATION DATA, AND THE ADDITIONAL DATA, AN ESTIMATED TIME OF ARRIVAL OF │
│   THE CUSTOMER TO THE POLYGONAL AREA ASSOCIATED WITH THE PICKUP LOCATION INTENT │
│                                   414                                    │
└─────────────────────────────────────────────────────────────────────────┘
                                    ↓
┌─────────────────────────────────────────────────────────────────────────┐
│   SEND, TO A COMPUTING DEVICE ASSOCIATED WITH THE STORE, THE ESTIMATED TIME OF │
│           ARRIVAL OF THE CUSTOMER TO ARRIVE AT THE POLYGONAL AREA        │
│                                   416                                    │
└─────────────────────────────────────────────────────────────────────────┘
```

FIG. 4

SYSTEMS AND METHODS FOR MACHINE-LEARNING OPTIMIZATION FOR ESTIMATED TIME OF ARRIVAL ANALYSIS

BACKGROUND

Restaurants, grocery stores, and retail stores often process hundreds of pickup orders on a daily basis. Regardless of by who picks up the item (e.g., delivery driver, customer, robot) or where the pickup occurs (e.g., in-store, drive-thru, curbside), retail store staff like to know the exact estimated time of arrival ("ETA") for a pickup. Even with an assigned ready or pickup time, unanticipated events, such as traffic, parking lot congestion, and the number of patrons, can produce an early, late, or even canceled pickup. Though a variety of techniques exist for generating ETAs, the inaccuracy and the inability of those techniques to consider a variety of metrics still leave much to be desired for an efficient, effective, and accurate technique for calculating and reporting ETAs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates an example process for generating ETAs of customers picking up orders in accordance with examples of the disclosure.

DETAILED DESCRIPTION

Figure 1:
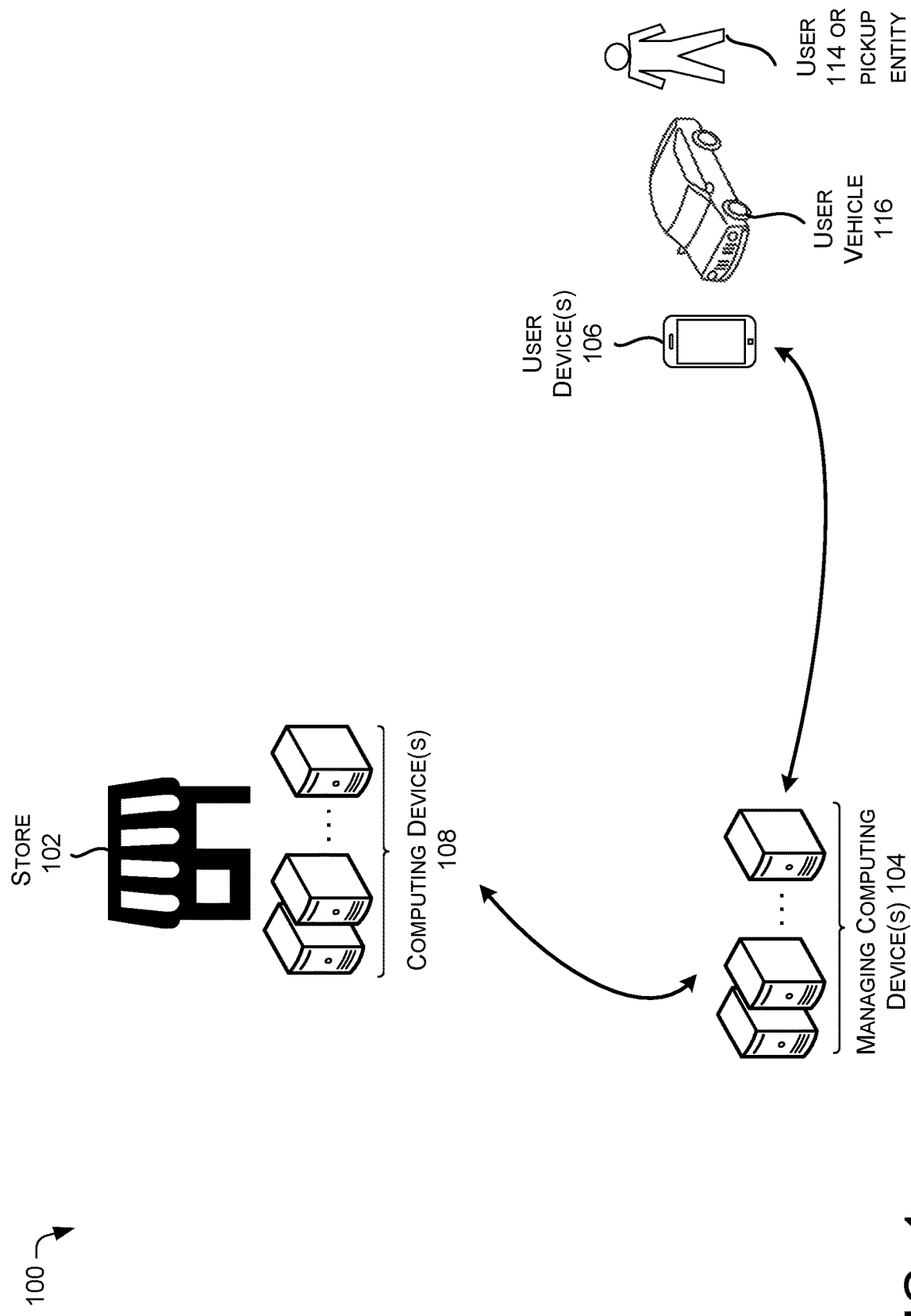
FIG. 1 illustrates an example environment including one or more stores, managing computing device(s), and user device(s), in accordance with examples of the disclosure.

As discussed above, knowing the precise time of a customer's arrival is increasingly becoming a desired and even necessary component of an efficient and effective business. Inaccuracies in reported ETAs may lead to logistical issues (e.g., improper management of order queues), increased waste (e.g., remakes) unsatisfied customers (e.g., extended waits for an order), inefficient staff (e.g., idling), and ultimately lost revenues for the business (e.g., cancelled orders). For example, if a restaurant purports to provide the freshest food, inaccurate ETAs can hinder the ability of staff to appropriately meet the guarantees it ensures to its customers. These inaccuracies may lead to logistical problems for staff, such as beginning an order's cooking process too early or too late, and may negatively influence customer expectations and experiences, such as expecting an order to be hot at pickup. In some cases, ineffective business operations due to the inaccurate management of pickup orders may lead to a negative perception and ultimately hinder the financial growth of businesses.

As previously mentioned, there are many previous attempts at producing ETAs. However, these conventional systems and methods often only take into consideration basic road maps and already calculated metrics, such as distance and direction, and do not take into account metrics such as current traffic, parking lot congestion, and business popularity, to name a few nonlimiting examples. While current systems and methods for calculating ETAs may be accurate over larger distances, as the margin of error is smaller and that potential error is overall less statistically impactful, the closer the customer is to the business, the greater the impacts and potential harms of an inaccurate ETA may be. For example, if a restaurant, located in a congested shopping center, knows that it needs to begin the customer's food preparation when they are five minutes away from the business, even an inaccuracy of one minute may severely impact the logistics and overall satisfaction of an order. A one-minute error in a reported ETA of thirty minutes is far less statistically significant when compared to a one-minute error in a reported ETA of four minutes. Because current ETA producing systems and methods do not consider metrics such as parking lot congestion and business popularity, these metrics, among others, may severely impact a patron's actual time of arrival when not considered in the calculation of that patron's ETA.

By applying machine learning models and methodologies using a deep neutral network of known behaviors and incoming data, the system processes, calculates, evaluates, and updates the presented ETAs to best inform all involved parties of a patron's status. Thus, the systems and methods described herein relate to utilizing machine-learning models to accurately calculating the arrival status of a customer to optimize the pickup and delivery of goods and services.

The techniques described herein are environment-friendly. For example, in the food industry, freshness may be important, and pickup orders prepared over a predetermined time will be thrown away if the customer who places the order does not arrive at an expected time. By monitoring the customer/pickup entity's location, systems and methods discussed here can reduce food waste significantly. Thus, the cost of running stores may be saved. Moreover, the staff efficiency associated with stores can be improved because the system can allow staff to prepare orders for customers knowing a precise time that the customer will arrive. Further, the user satisfaction can be improved.

The techniques described herein may improve the functioning of a computing device by providing a robust method of determining an estimated time of arrival. In some examples, the techniques can reduce overall processing by refraining from inputting data to a model before the distance between a user computing device and destination is below a threshold distance. Further, as the model may determine a more accurate estimated time of arrival relative to techniques not using the model, an updated estimated time of arrival may be determined less frequently than other techniques. Additional, subsequent actions such as beginning to prepare a good and/or service can be initiated more accurately, which can result in conserving downstream processing and operations. These and other improvements to the functioning of the computer are discussed herein.

The techniques described herein may be implemented in a number of ways. Example implementations are provided below with reference to the following figures. Although discussed in the context of food pickup scenarios, the methods, apparatuses, and systems described herein may be applied to a variety of scenarios (e.g., grocery pickup scenarios, pharmacy pickup scenarios, package drop-off scenarios, car rental scenarios, third-party delivery scenarios, providing any good or service, etc.), and are not limited to food pickup scenarios. In some instances, the techniques may be utilized in a drive-through pickup context, a curbside pickup context, an in-store pickup context, or the like.

FIG. 1 illustrates an example environment 100 including a store (e.g., store 102), one or more managing computing device(s) 104, and one or more user device(s) 106, in accordance with examples of the disclosure. For example, the store may include, but is not limited to, a restaurant, a supermarket, a grocery store, a cosmetic store, a shopping mall, a department store, a pharmacy, a vehicle rental center, and so on.

The store may have one or more computing devices associated with the store. For example, the store 102 can have one or more computing device(s) 108 associated with the store 102. In some examples, the store 102 may communicate with the managing computing device(s) 104 via the computing device(s) 108. In some examples, the managing computing device(s) 104 may send notifications and/or instructions to the computing device 108. In some examples, the computing device(s) 108 may be communicatively coupled with one or more order queues, an order-preparation robot (e.g., a food preparation robot, a robot to collect items or prepare an order, etc.), and the like.

The computing device(s) 108 can communicate with one or more user devices 106 and/or the user vehicle 116. In some examples, user devices 106 and the user vehicle 116 can be associated with the user 114 or a third party. For example, the third party can be a pickup entity that is picking up such as delivery drivers, delivery bikers, driverless vehicles, or the like. In some examples, the user 114 (e.g., a customer and/or requesting party or requesting entity) can make the order and pick up the order by herself. Additionally or alternatively, the order can be made by the user 114 while the order can be picked up by the pickup entity that provides picking up and delivery services. In some examples, the managing computing device(s) 104 may receive orders (e.g., food pickup orders) from the user device(s) 106. In some examples, the user device(s) 106 may collect location data and send the location data to the managing computing device(s) 104. Additionally, or alternatively, the user vehicle 116 may collect location data and send the location data to the managing computing device(s) 104.

In some examples, the location data may include, but is not limited to, a latitude, a longitude, an accuracy, and/or a speed of the user device(s) 106 and/or the user vehicle 116. In some examples, the location data can be updated in a predetermined period of time, in real-time, in near real-time, etc. In some examples, the location data may include an estimated time of arrival received from a map provider or a third party service.

In some examples, the managing computing device(s) 104 may send data/messages to the user device(s) 108 and/or the user vehicle 116 associated with the user 114. For example, the user device(s) 106 can send location data to the computing device(s) 108 (or data from which a location of the user device(s) 106 can be determined. For example, the user device(s) 106 can send location data to the managing computing device(s) 104 and the managing computing device(s) 104 can determine a location relative to one of the first store 102 or another store. In some examples, the first store 102 and/or the other store can be associated with a geo-fence such that the managing computing device(s) 104 can determine if the user device(s) 106 is within a geofence area. In some examples, the user device(s) 106 can send a beacon signal to a wireless transmitter associated with the first store 102, and the managing computing device(s) 104 can determine, upon receipt of an indication of the beacon signal, whether the user device(s) 106 is within a threshold distance of the first store 102. Additional details are discussed throughout the disclosure.

The user vehicle 116 can include but is not limited to cars, trucks, buses, wagons, motorcycles, scooters, bicycles, boats, airplanes, helicopters, drones, or hovercrafts.

Figure 2:
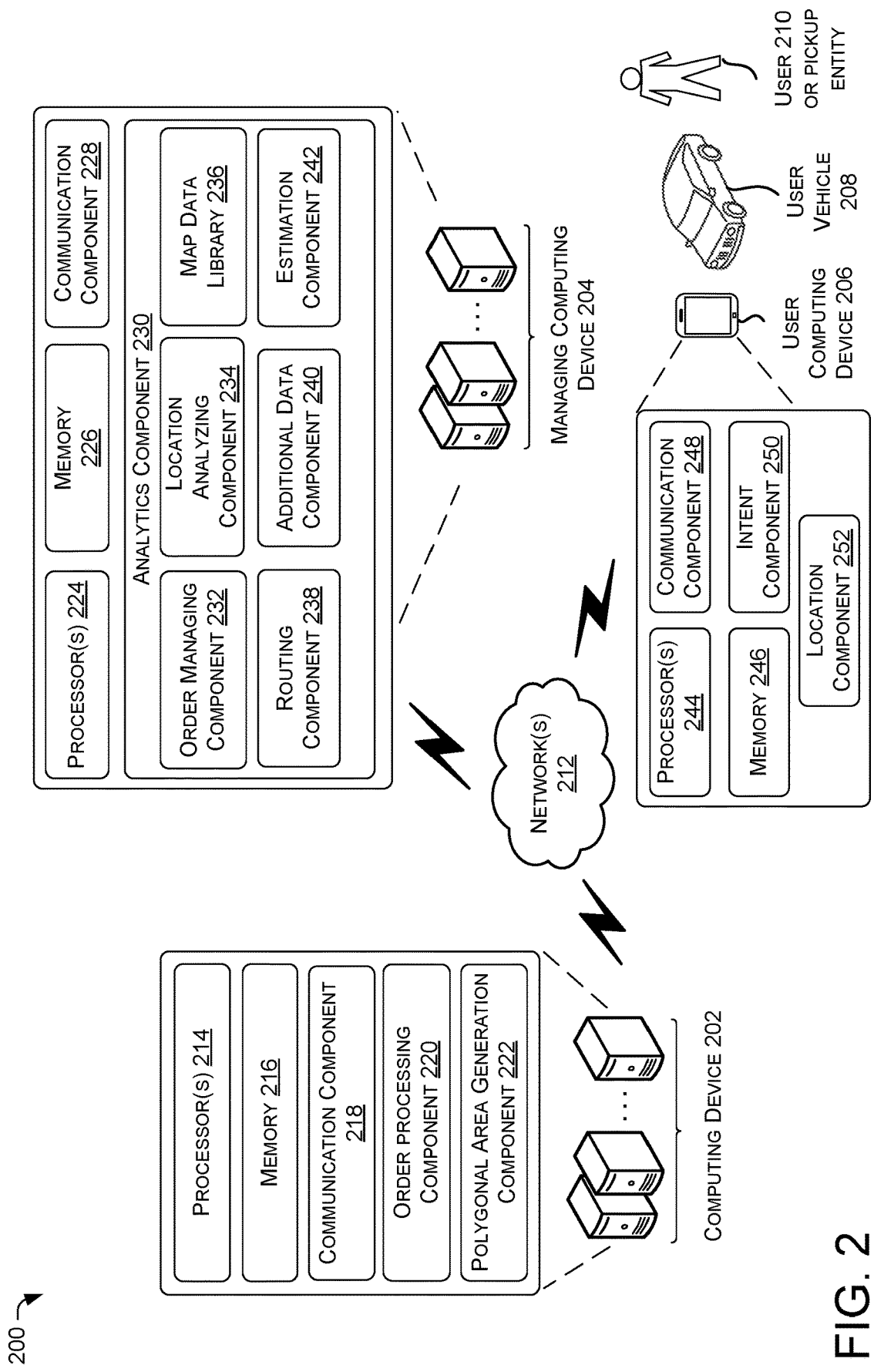
FIG. 2 illustrates an example environment that is usable to implement the techniques and systems described herein.

FIG. 2 illustrates an example environment 200 that is usable to implement the techniques and systems described herein. The environment 200 can include a computing device associated with a store, such as the computing device 202. The environment 200 can also include one or more managing computing devices, such as the managing computing device 204, which can provide processing and analytics. The environment 200 can also include one or more user computing devices, such as user computing device 206, and a user vehicle 208 associated with a user 210 or a third party. For example, the third party can be a pickup entity that is picking up an item from the store, an entity, such as delivery drivers, delivery bikers, or the like. In some examples, the user 210 can make the order and pick up the order by themselves. Additionally or alternatively, the order can be made by the user 210 while the order can be picked up by the pickup entity that provides picking up and delivery services. In various examples, the computing device 202, the managing computing device 204, and the user computing device 206 can communicate wired or wirelessly via one or more networks 212.

The managing computing device 204 can also be configured to communicate alerts, reports, analytics, recommendations, instructions, graphical user interfaces, etc., to the user computing device 206 and/or the user vehicle 208 associated with the user 210.

The computing device 202 (and/or any of the computing devices discussed herein) can individually include, but is not limited to, any one of a variety of devices, including portable devices or stationary devices. For instance, a device can comprise a data logger, an embedded system, a programmable logic controller, a sensor, a monitoring device, a smart phone, a mobile phone, a personal digital assistant (PDA), a laptop computer, a desktop computer, a tablet computer, a portable computer, a server computer, a wearable device, or any other electronic devices. In various examples, the computing device 202 can correspond to the first computing device(s) 108 in FIG. 1.

The computing device 202 can include one or more processor(s) 214 and memory 216. The processor(s) 214 can be a single processing unit or a number of units, each of which could include multiple different processing units. The processor(s) 214 can include a microprocessor, a microcomputer, a microcontroller, a digital signal processor, a central processing unit (CPU), a graphics processing unit (GPU), a security processor, etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), pulse counters, resistor/coil readers, other logic circuitry, a system on chip (SoC), and/or any other devices that perform operations based on instructions. Among other capabilities, the processor(s) 214 can be configured to fetch and execute computer-readable instructions stored in the memory 216.

The memory 216 can include one or a combination of computer-readable media. As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PRAM), Static Random-Access Memory (SRAM), Dynamic Random-Access Memory (DRAM), other types of Random-Access Memory (RAM), Read Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device. In contrast, communication media includes computer-readable instructions, data structures, program modules, or other data in a modulated data signal, such as a carrier wave. As defined herein, computer storage media does not include communication media. In some examples, non-transitory computer-readable media does not include communication media.

The memory 216 can include an operating system configured to manage hardware and services within and coupled to a device for the benefit of other modules, components, and devices. In some examples, the computing device 202 can include one or more servers or other computing devices that operate within a network service (e.g., a cloud service), or can form a mesh network, etc.

The computing device 202 can also include a communication component 218 to communicate with other computing device(s) (e.g., in mesh network) and/or to communicate via the network(s) 212. For example, the communication component 218 can perform compression, encryption, and/or formatting of the data. In some examples, the communication component 218 can transmit data using one or more protocols or languages, such as an extensible markup language (XML), Modbus, HTTP, HTTPS, USB, etc.

The computing device 202 can also include an order processing component 220. In some examples, the order processing component 220 can receive order data from the managing computing device 204 via the network(s) 212. In some examples, the order processing component 220 can receive instructions from the managing computing device 204 via the network(s) 212 to prepare orders. In some examples, the order processing component 220 can receive notifications from the managing computing device 204 via the network(s) 212 to cancel or delay orders. In some examples, the order processing component 220 can keep an order queue. For example, the store can prepare orders based on the order queue. The order processing component 220 can sort orders in the order queue based on the priority (and/or ETA) associated with the order. As such, orders with higher priorities can be in higher positions in the order queue (and will be made/prepared earlier), while orders with lower priorities can be in lower positions in the order queue (and will be made/prepared later).

In some examples, the order processing component 220 can determine the priorities of the orders based on a First-Arrived-First-Out (FAFO®) rule. That is, the customer who arrives first at the store will be prioritized higher than another customer who has not yet arrived at the store. For example, a first user has a first arrival time of 9:30 am, while a second user has a second arrival time of 9:45 am. Then, the order processing component 220 can prioritize the first order associated with the first user. As such, the first order associated with the first user can have a higher priority (be in a higher position in the order queue), while a second order associated with the second user can have a lower priority (be in a lower position in the order queue). In some examples, the arrival time of the user can be an estimated time of arrival (ETA). In some examples, the order processing component 220 can insert an order with an earlier ETA to usurp the order queue. For example, a second user can make a second order before a first user who makes a first order. However, a second ETA of the second user is ahead of a first ETA of the first user, and thus the second order associated with the second user is prioritized against the first order associated with the first user.

Additionally or alternatively, the order processing component 220 can determine the priorities of the orders based on the preparation time of each order. An order with a shorter preparation time can be in a lower position in the order queue, and an order with a longer preparation time can be in a higher position in the order queue. For example, a first order associated with a first user has a first preparation time of 2 minutes, while a second order associated with a second user has a second preparation time of 4 minutes. Then, the order processing component 220 can prioritize the first order. As such, the first order associated with the first user can have a higher priority (be in a higher position in the order queue), while a second order associated with the second user can have a lower priority (be in a lower position in the order queue). In some examples, the preparation time of the order can be an estimated preparation time.

In some examples, the order processing component 220 can determine the priorities of the orders based on a combination of different factors. For example, a first order associated with a first user has a first estimated arrival time of 9:30 am but only takes 2 minutes to prepare, while a second order associated with a second user has a second estimated arrival time of 9:35 am but takes 4 minutes to prepare. Then the order processing component 220 can prioritize the first order associated with the first user. As another example, a first order associated with the first user has a first estimated arrival time of 9:35 am and takes 2 minutes to prepare, while a second order associated with a second user has a second estimated arrival time of 9:30 and takes 4 minutes to prepare. Then the order processing component 220 can prioritize the second order associated with the second user. As yet another example, a first order associated with the first user has a first estimated arrival time of 9:30 am and takes 2 minutes to prepare, while a second order associated with a second user has a second estimated arrival time of 9:30 and takes 4 minutes to prepare. Then the order processing component 220 can prioritize the second order associated with the second user.

In some examples, the order processing component 220 can insert a new order in the order queue when receiving the new order based on a priority associated with the new order and the priorities of other orders already in the order queue.

In some examples, the computing device 202 may include a polygonal generation component 222, which may generate polygonal areas around the store, in which a polygonal area may correspond to a pick-up location. For example, the store may be associated with a polygonal area, which may be a geofence area, such that the managing computing device 204 may determine if the user device 206 is within the polygonal area. As described herein, a polygonal area can represent a virtual perimeter for a real-world geographic area. In some examples, multiple polygonal areas may be associated with the store, wherein the multiple polygonal areas are associated with various pick-up locations in which the user 210 may pick up good(s) ordered from the store. For example, a first polygonal area may correspond to an area around a drive-through location of the store, such as a drive-through entrance. A second polygonal area may correspond to a parking lot associated with the store, while a third polygonal area may correspond to designated curbside pick-up locations (e.g., individual parking locations) or spots.

In some examples, the polygonal area could be dynamically generated or match a predefined set of boundaries. In other examples, the polygonal area may be determined by an owner of the store, such as a merchant. In some examples, the polygon areas can be determined by annotating image data (e.g., obtained via drone or satellite) or identify particular regions proximate the store.

The use of a geofence is called geofencing, and one example of use involves a location-aware device of a location-based service user entering or exiting a geofence. In some examples, the user device 206 can send a beacon signal to a wireless transmitter associated with the store, and the managing computing device 204 can determine, upon receipt of an indication of the beacon signal, whether the user device 206 is within a threshold distance of a polygonal area. Based on determining that the user computing device 206 is within a threshold distance of the polygonal area, the analytics component 230 may send, to the computing device 202, an indication that the user computing device 206 is within the threshold distance of the polygonal area, thus allowing the store to adequately prepare the user's 210 order.

The managing computing device 204 can include one or more processor(s) 224, a memory 226, and a communication component 228, each of which can be implemented similar to the processor(s) 214, the memory 216, and/or the communication component 218 of the computing device 202.

In some examples, the managing computing device 204 can include an analytics component 230, including one or components such as an order managing component 232, a location analyzing component 234, a map data library 236, a routing component 238, an additional data component 240, and an estimation component 242.

The analytics component 230 can receive order data from the computing device 202 and can store the order data in the order managing component 232. In some examples, the order data may include data indicative of item data (which may indicate items ordered by the user, e.g., tacos, burritos, salads, a service, or the like), combo data (which may indicate combos ordered by the user, e.g., bowl combo, cheese quesadilla combo, breakfast combo, or the like), ingredient data (which may indicate ingredients ordered by the user, e.g., rice, beans, chicken, steak, pulled pork, lettuce, pico de gallo, sour cream, or the like), preference data (which may indicate preferences associated with the user, e.g., sweet, sour, salty, bitter, savory preferences, or the like), food allergy data (which may indicate food allergies associated with the user, e.g., gluten allergy, peanut allergy, seafood allergy, or the like), discount data (which may indicate the discount information associated with the user, e.g., promo codes, coupons, credits, or the like), membership data (which may indicate membership information associated with the user), payment data (which may indicate payment information associated with the user, such as debit card information, credit card information, PayPal information, check information, or the like) associated with the user 210, or the like. In some examples, the order managing component 232 can store the timestamp data associated with the order data input from the computing device 202.

In some examples, the order data may include a destination intent associated with picking up a good or service. For example, order data may specify where a user is intending to pick up an order, such as in a curbside parking location, through a drive through, at a loading dock, at a pickup window or counter, or the like.

In some examples, the analytics component 230 can receive location data from the user computing device 206 and/or the user vehicle 208. In some examples, the analytics component 230 can store the location data in the location analyzing component 234. In some examples, the location data can indicate the location of the user computing device 206 and/or the user vehicle 208 associated with the user 210 or the pickup entity. In some examples, the location data can include Global Positioning System (GPS) data, sensor data, cellular location data (e.g., base station data or the like), indoor positioning data (e.g., WIFI beacon data, Bluetooth beacon data, or the like), mobile phone application data that share a user's location (e.g., a fitness app that monitors the user's steps and locations), and so on. In some examples, the location data can include a latitude associated with the user computing device 206 (or the user vehicle 208), a longitude associated with the user computing device 206 (or the user vehicle 208), an accuracy associated with location data, a speed associated with the user computing device 206 (or the user vehicle 208), or timestamp data associated with the location data. In some examples, the location data can be updated in a predetermined period of time, in real-time, in near real-time, etc.

The analytics component 230 can include a map data library 236 which includes map data. In some examples, the map data can include land boundary data of roads (e.g., streets, freeways, highways, bridges, or the like), buildings (e.g., houses, hotels, hospitals, offices, or the like), facilities (e.g., parking lots, gas stations, churches, libraries, or the like), green spaces (e.g., parks, gardens, woods, or the like), waters (e.g., rivers, lakes, seas, or the like), and so on. In some examples, the map data can include, but is not limited to, imagery data, terrain data, latitude and longitude coordinates, transit data, traffic data, or the like. In some examples, the analytics component 230 can determine, using the location analyzing component 234, whether the location associated with the user computing device 206 and/or the user vehicle 208 is within a threshold distance to one or more stores based on the location data and the map data. For example, the user computing device 206 can send location data to the computing device(s) 206 (or data from which a location of the user computing device 206 can be determined. For example, the user computing device 206 can send location data to the managing computing device 204 and the managing computing device 204 can determine a location relative to the store.

The analytics component 230 can include a routing component 238. In some examples, the routing component 238 can be configured to determine routes from one location to another location. For example, the routing component 238 can determine routes from the user 210's location to one or more stores based on the location data and/or the map data. In some examples, the routing component 238 can be configured to determine routes based on different requirements such as the shortest travel distance, the shortest travel time, the lowest traffic, or the like.

In some examples, the analytics component may include an additional data component 240. The additional data component 240 may be configured to determine factors that may affect the user's 210 arrival time or that affect wait times associated with the store. This may include a variety of factors such as, but not limited to, a time of day, a minute of a day, an hour of a day, a day of a week, a month of a year, whether a day is a holiday, a current number of pending and completed orders at the store, or a number of customers at the store, a direction between the user device and the store (e.g., North, South, East, West, Northwest, Southwest, (or any coarse or fine directional indicators, such as bearing or heading between a user device 206 and a store location) etc.), traffic data, a history of previous orders associated with the customer, a speed and/or acceleration of the pickup vehicle, a current occupancy of a parking lot associated with the store, or a current weather, order volume associated with the store, a number of customers associated with a location of the store, wait time associated with the store, order throughput data associated with the store, to name a few examples.

The analytics component 230 can include an estimation component 242. In some examples, the estimation component 242 may include a machine-learning model and can be configured to determine an estimated arrival time of the user 210 or the pickup entity at least based on the location data, the map data, the pickup intent, and/or the additional data. In some examples, the estimated arrival time can be indicative of a time the customer will arrive at a user-designated polygonal area. Designating a polygonal area is generated by the intent component 250, which is discussed below.

In some examples, the estimation component 242 may utilize machine-learning models(s) that may be configured to determine an ETA of the user 210 to the polygonal area associated with the intended pick-up location. For example, the machine-learning model(s) may be configured to receive a request and output one or more ETAs that may be associated with the request, as well as confidence level associated with the ETA(s). In some examples, the machine-learning model(s) may be a deep neural network or a random decision forest model. In some examples, the estimation component 242 may utilize a variety of machine-learning model(s). In some examples, the estimation component 242 may train the machine-learning model(s) by using training data specific to the store the order is associated with. Training the machine-learning model(s) is discussed in more detail, below.

In some examples, the estimation component 242 may train the machine-learning model(s) to determine one or more ETAs associated with the request(s). Additionally, or alternatively, the estimation component 242 may train the machine-learning model(s) to determine respective confidence levels associated with the ETA(s). In some examples, the estimation component 242 may first train the machine-learning model(s) when a new request for an ETA has been received by the estimation component 242 (e.g., or any time thereafter when an updated request for an ETA is received), in addition to re-training the machine-learning models periodically. In some examples, the estimation component 242 may re-train the machine-learning model(s) automatically. Such re-training of the machine-learning model(s) may be based on a number of factors. Factors may include, for example, how frequently orders are placed at the store, a number of customers at a store, a number of requests for ETA being made, determinations that a difference between the ETA and the actual time of arrive exceeds a threshold amount, and/or any other similar factor.

The machine-learning model(s) may be trained, using training data, to receive input from the user computing device 206 and/or the computing device 202 and generate, as output, an ETA of the user 210 arriving at the store. For example, input may include, but is not limited to, route information from the routing component 238, map data from the map data library 236, additional data from the additional data component 240, location data from the location component 252, and/or intent data from the intent component 250. However, the machine-learning model(s) may use, as input, any data from any component(s) of the managing computing device 204, the user computing device 206, and/or the computing device 202. As described above, the machine-learning model(s) may be trained using a variety of training data. In some examples, training data may include information regarding prior ETAs associated with prior orders placed at the store.

In other examples, training data may include prior confidence levels associated with prior request to generate prior ETAs. For example, confidence levels may be assigned to one or more ETAs which have been previously generated by the machine-learning models, wherein a higher confidence level is associated with a higher likelihood an ETA is correlated to the actual time the user arrives at the store, thus resulting in a higher probability that the ETA is correct. Alternatively, a lower confidence score is associated with a lower likelihood that ETA is correlated to the actual time the user arrives at the store, thus resulting in a lower probability that the ETA is correct. In some examples, the estimation component 242 may associate the information regarding the prior ETAs with prior confidence levels such that the machine-learned model(s) may use such learned relationship to generate one or more new ETAs and one or more new confidence scores associated with the new ETAs.

In some examples, the estimation component 242 may train machine-learning model(s) using training data specific to the location with which the machine-learning model(s) will be used, such as a specific restaurant or store. For example, the estimation component 242 may train machine-learning model(s) based at least in part on interaction data associated with a particular store or location. Interaction data may include data regarding previous interactions at the store, such as orders, average wait times, pickup times, and the like. Interaction data may additionally or alternatively include ETAs which were previously generated for previous orders at the store. Further, interaction data may include confidence levels associated with ETAs that were determined at a previous time. In such examples, the estimation component 242 may use the interaction data as training data in order to learn the relationship between the ETAs and confidence levels, thus gaining a better understanding of ETAs corresponding to certain locations and stores. In this way, the machine-learning model(s) may rely on data associated with particular spaces to generate ETAs tailored specifically to those spaces.

In some examples, a machine learning model can be trained to minimize the loss or error between an actual arrival time at a location (e.g., specified in ground truth data) and the estimated time of arrival output by the model. The loss can be determined and can be input to the model to determine parameters to minimize the loss. The model can be trained iteratively, for example, using gradient descent, until a number of iterations are performed or until a desired precision is reached. In some examples, weights or parameters of the machine learning model can be updated to generate or otherwise determine the trained machined learning model.

The user computing device 206 can include one or more processor(s) 244, a memory 246, and a communication component 248, each of which can be implemented similar to the processor(s) 214, the memory 216, and/or the communication component 248.

In some examples, the user computing device 206 may include an intent component 250. The intent component 250 may receive from the user 210, an input corresponding to an intended pick-up location. The intended pick-up location may correspond to a location in which the user 210 desires to pick up their order from the store. This may include, for example, drive-through pick-up, curbside pick-up, or in-store pick-up. In some examples, intent component 250 may receive, from the user 210, the intended pick-up location upon receiving, from the user, the order. The intent component 250 may send the intent to the managing computing device 204, in which the pick-up intent may be stored in the order managing component 232.

In some examples, the user computing device 206 may send the pick-up intent to the computing device 202, such as to the order processing component 220 and/or the polygonal area generation component 222. For example, the order processing component 220 may place a drive-through order higher in the queue than an in-store pickup order, as it may take the user 210 longer to find a parking spot and walk into the store than it takes a user to access the store's drive through window. In some examples, a pickup order may correspond to a takeaway order or a dine-in order where the customer or requesting party orders ahead.

In some examples, a pick-up intent may correspond to a polygonal area. For example, an order with an intent of a drive-through pickup may correspond to a polygonal area associated with a drive-through, such as a drive-through entrance. Alternatively, an order with a pick-up intent of curbside may correspond to a polygonal area associated with designated curbside pick-up parking spots. Similarly, an order with a pick-up intent of in-store may correspond to a polygonal area associated with the store's parking spots. While this application describes drive-through, curbside, or in-store as pickup options, any pickup locations and options may be used herein.

The user computing device 206 can also include a location component 252 to collect location data associated with the user computing device 206. In some examples, the location data can include Global Positioning System (GPS) data, sensor data, cellular location data (e.g., base station data or the like), indoor positioning data (e.g., WIFI beacon data, Bluetooth beacon data, or the like), mobile phone application data that share a user's location (e.g., a fitness app that monitors the user's steps and locations), and so on. In some examples, the location data can include a latitude associated with the user computing device 206, a longitude associated with the user computing device 206, an accuracy associated with location data, a speed associated with the user computing device, or timestamp data associated with the location data. In some examples, the location data can be updated in a predetermined period of time, in real-time, in near real-time, etc.

The environment 200 also includes the user 210 who can employ the user computing device 206 and the user vehicle 208. In some examples, the user vehicle 208 can have similar functions discussed with respect to the user computing device 206. In some examples, the user 210 or the pickup entity can interact with the user computing device 206 to perform a variety of operations. In some examples, the user 210 can make orders (e.g., food pickup orders) via the user computing device 206. In some examples, the user 210 or the pickup entity can review the information displayed via the user computing device 206. In some examples, the user 210 or the pickup entity can review the location data indicating the location of the user 210 (or the user vehicle 208). In some examples, the location of the user computing device 206 (or the user vehicle 208) can be updated in a predetermined period of time, in real-time, in near real-time, etc. In some examples, the user 210 or the pickup entity can review the messages/alerts displayed via the user computing device 206 (or the user vehicle 208) and follow the instructions to reroute from the location associated with the user computing device 206 (or the user vehicle 208) to the first store (correct store or intended store). Additionally or alternatively, the user 210 or the pickup entity can review the messages/alerts displayed via the user computing device 206 (or the user vehicle 208).

The network(s) 212 can include the Internet, a Mobile Telephone Network (MTN), Wi-Fi, a cellular network, a mesh network, a Local Area Network (LAN), a Wide Area Network (WAN), a Virtual LAN (VLAN), a private network, and/or other various wired or wireless communication technologies.

The operations of the computing device 202, the managing computing devices 204, and the user computing device 206 are further provided in connection with the various figures of this disclosure. Further, any of the functions or operations provided by one component can be provided by any other component discussed herein. That is, features of the managing computing device 204 can be provided by the computing device 202, and/or the user computing device 206 (or the user vehicle 208), and vice versa. For example, the computing device 202 can also have analytic components to perform similar operations discussed with regard to managing computing device 204.

Figure 3:
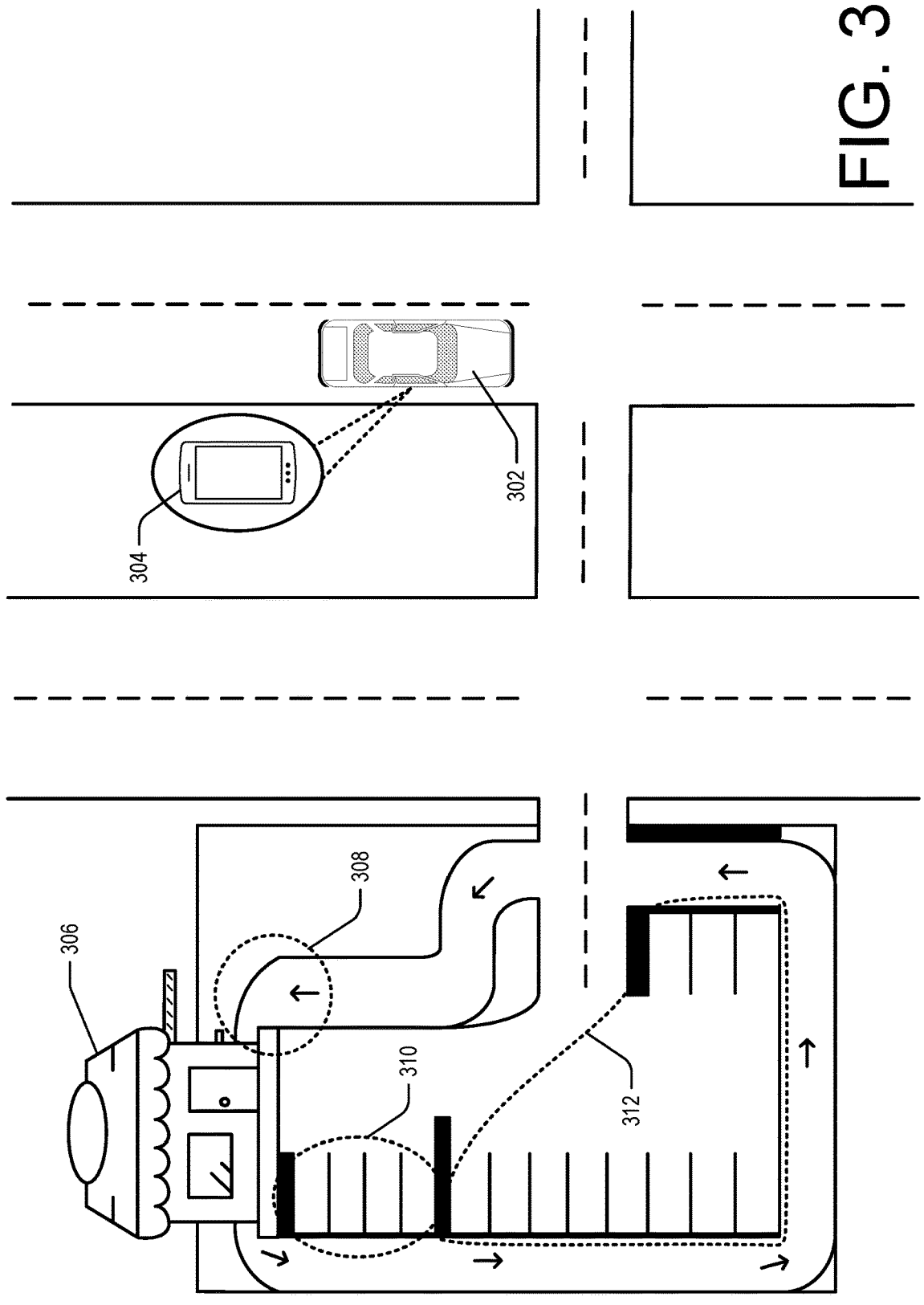
FIG. 3 illustrates another example environment that is usable to implement the techniques and systems described herein.

FIG. 3 illustrates another example environment 300 that is usable to implement the techniques and systems described herein. For example, the example environment 300 illustrates a birds-eye view of a user traveling to pick-up an order from a store. For example, the user may be traveling in a vehicle, such as user vehicle 302. In some examples, the user may additionally have a device associated with the user, such as user device 304. In some examples, the user device 304 may have GPS capabilities such that the user device 304 may send location data associated with the user device 304 to a computing device associated with the store, such as store 306, such that the store may determine how far the user is from the store.

In some examples, the user may place an order to pick-up at the store. For example, the store 306 may be a coffee store. In some examples, the user may place the order to pick up a cappuccino at the store 306 via the user device 304. When placing the order, the user may determine a pick-up intent, which may correspond to the physical location that the user wishes to pick up the coffee. A pickup intent may include, for example, drive-through, curbside, or in-store, to name a few examples.

In some examples, the pickup intent may correspond to a polygonal area. The polygonal area may be a geofence, or a virtual perimeter, such that a computing device associated with the polygonal area and the user computing device 304 may determine when the user computing device comes into contact with or within a threshold distance of the polygonal area. In some examples, the store 306 may have various polygonal areas which may be associated with the various pickup locations. For example, the store 306 may include a first polygonal area 308 associated with a drive-through pickup, which may be located at an entrance of the store's 306 drive-through; a second polygonal area 310 associated with a curbside pickup, which may be located at the store's 306 designated curbside pickup parking spots; and/or a third polygonal area 312 associated with an in-store dining and/or pickup, which may be located at the store's parking lot.

Continuing with the illustrative example above, suppose the user selects in-store as the designated pick-up location. To maintain the satisfaction of the store's customers, it may be important to the store that coffees ordered for pick-up are still hot and fresh when the customer arrives. Thus, knowing an ETA and location of the customer may determine a time in which the order is started. Suppose, for example, it may take the store 3 minutes to make a cappuccino. Based on the size of the parking lot, the average time to park and walk into the store may be 5 minutes. Thus, the store 306 may start making the cappuccino 2 minutes after receiving an indication that the customer is within the polygonal area associated with the store's 306 parking lot.

FIG. 4 illustrates an example process 400 for determining estimated arrival times of customers to specified pick-up locations at stores in accordance with examples of this disclosure. In some examples, at least some operations of the process 400 may be performed by the computing device(s) 110 in FIG. 1, the managing computing device(s) 104 in FIG. 1, the user device(s) 106 in FIG. 1, the user vehicle 116 in FIG. 1, the computing device 202 in FIG. 2, the managing computing device 204 in FIG. 2, the user computing device 206 in FIG. 2, the user vehicle 208, as described herein.

For example, at operation 402, the process 400 may include at least receiving, from a merchant associated with a store, map data representing a polygonal area proximate the store.

At operation 404, the process 400 may include at least receiving a pickup order associated with a customer. In some examples, the pickup order may indicate at least one good or service. For example, the store may be, but is not limited to, a restaurant, a supermarket, a grocery store, a cosmetic store, a shopping mall, a department store, a pharmacy, a vehicle rental center, and so on. In some examples, the pickup order may additionally or alternatively include a pickup intent. A pickup intent may include, for example, a way in which the customer wishes to pick up the good or service from the store. This may include, for example, a drive-through pickup (in which the customer may pick-up the good or service via a drive-through associated with the store), a curbside pickup (in which the customer may pick-up the good or service at a curbside pickup location associated with the store), or an in-store pickup (in which the customer may park in a parking lot associated with the store and walk into the store to pick-up the good or service), to name a few non-limiting examples.

At operation 406, the process 400 may include at least associating the pickup order with a user computing device associated with the customer. For example, the pickup order may be placed on a user computing device associated with the customer. In some examples, the order may be placed by the user online, such as via a website or an application associated with the store. In other examples, the order may be placed via a third-party application or service.

At operation 408, the process 400 may include at least receiving location data from the user computing device. For example, the user computing device may contain one or more GPS systems which may enable the user computing device to determine location data. In some examples, the location data may include at least one of a latitude associated with the user device, a longitude associated with the user device, an accuracy associated with the location data, a speed associated with the user device, or timestamp data associated with the location data. In some examples, the location data is updated in a predetermined period of time, in real-time, or in near real-time.

At operation 410, the process 400 may include at least determining additional data associated with the user computing device. Additional factors may include one or more factors that may affect the estimated arrival time of the customer. These may include, but are not limited to, a time of a day, a minute of a day, an hour of a day, a day of a week, a month of a year, whether a day is a holiday, a current number of orders at the store, or a number of customers at the store, a direction between the user device and the store (e.g., North, South, East, West, Northwest, Southwest, etc.), traffic data, a history of previous orders associated with the customer, a speed and/or acceleration of the customer's vehicle, a current occupancy of a parking lot associated with the store, or a current weather, to name a few examples.

At operation 412, the process 400 may include at least inputting pickup order, the location data, and the additional data into a machine-learning model trained to determine a particular estimated time of arrival of a customer to a location of the store. The machine-learning model may be a machine-learning model configured to determine an ETA of the user to the polygonal area associated with the store. For example, the machine-learning model may be configured to receive a request and output one or more ETAs that may be associated with the request, as well as confidence level associated with the ETA(s). In some examples, the machine-learning model may be a deep neural network, a random decision forest model, or the like.

At operation 414, the process 400 may include at least receiving, from the machine-learning model and based at least in part on the pickup order, the location data, and the additional data, an estimated time of arrival of the customer to the polygonal area associated with the pickup location intent.

At operation 416, the process 400 may include at least sending, to a computing device associated with the store, the estimated time of arrival of the customer to arrive at the polygonal area. The computing device associated with the store may be accessible to the merchant and/or one or more employees of the store who may be responsible for preparing the order. By knowing an accurate ETA of the customer, the employees of the store may adequately and timely prepare the order for the customer.

The techniques discussed above can be implemented in hardware, software, or a combination thereof. In the context of software, operations represent computer-executable instructions stored on one or more computer-readable storage media that, when executed by one or more processors, configure a device to perform the recited operations. Generally, computer-executable instructions include routines, programs, objects, components, data structures, or the like that perform particular functions or implement particular abstract data types.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes, or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: A system comprising: one or more processors; and one or more non-transitory computer-readable media storing computer executable instructions that, when executed, cause the one or more processors to perform operations comprising: receiving map data representing a plurality of polygonal areas proximate a store; receiving a pickup order associated with a requesting entity, the pickup order indicating at least one good or service and a pickup location intent; associating the pickup order with a user computing device associated with a pickup entity; receiving location data from the user computing device; determining additional data associated with at least one of the user computing device or the store; inputting the pickup order, the location data, and the additional data into a machine-learning model trained to determine a particular estimated time of arrival of an entity to a pickup location of the store; receiving, from the machine-learning model and based at least in part on the pickup order, the location data, and the additional data, an estimated time of arrival of the pickup entity to a polygonal area associated with the pickup location intent; and sending, to a computing device associated with the store, the estimated time of arrival of the pickup entity to arrive at the polygonal area.

B: The system of paragraph A, wherein the polygonal area represents at least one of: a premises boundary associated with the store; a location of a drive-through associated with the store; a location of a curbside-pickup location associated with the store; a location of a parking lot associated with the store; or a physical location within the store.

C: The system of paragraph A or B, wherein the machine-learning model is trained based at least in part on ground truth data representing actual travel times between a first location of the user computing device and a second location associated with the store and a ground truth intent representing a declared region to arrive at the store.

D: The system of any of paragraphs A-C, the operations further comprising receiving, from the machine-learning model, confidence data associated with the estimated time of arrival.

E: The system of any of paragraphs A-D, wherein the additional data includes at least one of: a time of day the estimated time of arrival is determined; a day of a month the estimated time of arrival is determined; a day of a year the estimated time of arrival is determined; a minute of an hour the estimated time of arrival is determined; a weather pattern; order volume associated with the store; a number of customers associated with a location of the store; wait time associated with the store; order throughput data associated with the store; or a direction the requesting entity is relative to the store.

F: The system of any of paragraphs A-E, wherein the location data is first location data at a first time and the estimated time of arrival is a first estimated time of arrival determined at a first time, the operations further comprising: receiving, at a second time after the first time, second location data from the user computing device; inputting, based on receiving the second location data from the user computing device, the pickup order, the second location data, and the additional data into the machine-learning model; receiving, from the machine-learning model and based at least in part on the pickup order, the second location data, and the additional data, a second estimated time of arrival of the pickup entity to the polygonal area associated with the pickup location intent; and sending, to a computing device associated with the store, the second estimated time of arrival of the pickup entity to arrive at the polygonal area.

G: The system of any of paragraphs A-F, wherein the machine-learning model includes at least one of a random decision forest model or a deep neural network.

H: A method, implemented at least in part by one or more computing devices, the method comprising: receiving, from a merchant associated with a store, map data representing a polygonal area proximate the store; receiving a pickup order associated with a customer, the pickup order indicating at least one good or service and a pickup location intent; associating the pickup order with a user computing device associated with the customer; receiving location data from the user computing device; determining additional data associated with the user computing device; inputting pickup order, the location data, and the additional data into a machine-learning model trained to determine a particular estimated time of arrival of a customer to a location of the store; receiving, from the machine-learning model and based at least in part on the pickup order, the location data, and the additional data, an estimated time of arrival of the customer to the polygonal area associated with the pickup location intent; and sending, to a computing device associated with the store, the estimated time of arrival of the customer to arrive at the polygonal area.

I: The method of paragraph H, wherein the polygonal area represents at least one of: a premises boundary associated with the store; a location of a drive-through associated with the store; a location of a curbside-pickup location associated with the store; a location of a parking lot associated with the store; or a physical location within the store.

J: The method of paragraph H or I, wherein the machine-learning model is trained based at least in part on ground truth data representing actual travel times between a first location of the user computing device and a second location associated with the store and a ground truth intent representing a declared region to arrive at the store.

K: The method of any of paragraphs H-J, further comprising receiving, from the machine-learning model, confidence data associated with the estimate time of arrival.

L: The method of any of paragraphs H-K, wherein the additional data includes at least one of: a time of day the estimated time of arrival is determined; a day of a month the estimated time of arrival is determined; a day of a year the estimated time of arrival is determined; a minute of an hour the estimated time of arrival is determined; a weather pattern; order volume associated with the store; a number of customers associated with a location of the store; wait time associated with the store; order throughput data associated with the store; or a direction the customer is relative to the store.

M: The method of any of paragraphs H-L, wherein the location data is first location data at a first time and the estimated time of arrival is a first estimated time of arrival determined at a first time, further comprising: receiving, at a second time after the first time, second location data from the user computing device; inputting, based on receiving the second location data from the user computing device, the pickup order, the second location data, and the additional data into the machine-learning model; receiving, from the machine-learning model and based at least in part on the pickup order, the second location data, and the additional data, a second estimated time of arrival of the customer to the polygonal area associated with the pickup location intent; and sending, to a computing device associated with the store, the second estimated time of arrival of the customer to arrive at the polygonal area.

N: The method of any of paragraphs H-M, wherein the machine-learning model includes at least one of a random decision forest model or a deep neural network.

O: One or more non-transitory computer-readable media storing computer executable instructions that, when executed, cause one or more processors to perform operations comprising: receiving, from a merchant associated with a store, map data representing a polygonal area proximate the store; receiving a pickup order associated with a customer, the pickup order indicating at least one good or service and a pickup location intent; associating the pickup order with a user computing device associated with the customer; receiving location data from the user computing device; determining additional data associated with the user computing device; inputting pickup order, the location data, and the additional data into a machine-learning model trained to determine a particular estimated time of arrival of a customer to a location of the store; receiving, from the machine-learning model and based at least in part on the pickup order, the location data, and the additional data, an estimated time of arrival of the customer to the polygonal area associated with the pickup location intent; and sending, to a computing device associated with the store, the estimated time of arrival of the customer to arrive at the polygonal area.

P: The one or more non-transitory computer-readable media of paragraph O, wherein the polygonal area represents at least one of: a premises boundary associated with the store; a location of a drive-through associated with the store; a location of a curbside-pickup location associated with the store; a location of a parking lot associated with the store; or a physical location within the store.

Q: The one or more non-transitory computer-readable media of paragraph O or P, wherein the machine-learning model is trained based at least in part on ground truth data representing actual travel times between a first location of the user computing device and a second location associated with the store and a ground truth intent representing a declared region to arrive at the store.

R: The one or more non-transitory computer-readable media of any of paragraphs O-Q, the operations further comprising receiving, from the machine-learning model, confidence data associated with the estimated time of arrival.

S: The one or more non-transitory computer-readable media of any of paragraphs O-R, wherein the additional data includes at least one of: a time of day the estimated time of arrival is determined; a day of a month the estimated time of arrival is determined; a day of a year the estimated time of arrival is determined; a minute of an hour the estimated time of arrival is determined; a weather pattern; order volume associated with the store; a number of customers associated with a location of the store; wait time associated with the store; order throughput data associated with the store; or a direction the customer is relative to the store.

T: The one or more non-transitory computer-readable media of any of paragraphs O-S, wherein the location data is first location data at a first time and the estimated time of arrival is a first estimated time of arrival determined at a first time, the operations further comprising: receiving, at a second time after the first time, second location data from the user computing device; inputting, based on receiving the second location data from the user computing device, the pickup order, the second location data, and the additional data into the machine-learning model; receiving, from the machine-learning model and based at least in part on the pickup order, the second location data, and the additional data, a second estimated time of arrival of the customer to the polygonal area associated with the pickup location intent; and sending, to a computing device associated with the store, the second estimated time of arrival of the customer to arrive at the polygonal area.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
    one or more processors; and
    one or more non-transitory computer-readable media storing computer executable instructions that, when executed, cause the one or more processors to perform operations comprising:
        receiving map data representing a plurality of polygonal areas proximate a store;
        receiving a pickup order associated with a requesting entity, the pickup order indicating at least one good or service and a pickup location intent;
        associating the pickup order with a user computing device associated with a pickup entity;
        receiving location data from the user computing device;
        determining additional data associated with at least one of the user computing device or the store;
        refraining from inputting the pickup order, the location data, the pickup location intent, and the additional data into a machine-learning model in response to determining that a distance between the user computing device and the pickup location intent is above a threshold distance;
        inputting the pickup order, the location data, the pickup location intent, and the additional data into the machine-learning model in response to determining that the distance between the user computing device and the pickup location intent is below the threshold distance, wherein the machine-learning model is trained to determine a particular estimated time of arrival of a particular entity to a pickup location of the store, wherein the machine-learning model is further trained based at least in part on ground truth data representing actual travel times between a first location of a training user computing device and a second location associated with the store and a ground truth intent representing a declared region to arrive at the store, wherein the declared region corresponds to an area of the plurality of polygonal areas associated with the store;
        reducing a rate at which the particular estimated time of arrival is determined based at least in part on determining an accuracy with which the machine-learning model determines the particular estimated time of arrival, wherein reducing the rate at which the particular estimated time of arrival is determined causes an overall processing of the one or more processors to be reduced;
        receiving, from the machine-learning model and based at least in part on the pickup order, the location data, and the additional data, an estimated time of arrival of the pickup entity to a polygonal area of the plurality of polygonal areas associated with the pickup location intent; and sending, to a computing device associated with the store, the estimated time of arrival of the pickup entity to arrive at the polygonal area of the plurality of polygonal areas.

2. The system of claim 1, wherein the polygonal area of the plurality of polygonal areas represents at least one of:
a premises boundary associated with the store;
a location of a drive-through associated with the store;
a location of a curbside-pickup location associated with the store;
a location of a parking lot associated with the store; or
a physical location within the store.

3. The system of claim 1, the operations further comprising receiving, from the machine-learning model, confidence data associated with the estimated time of arrival.

4. The system of claim 1, wherein the additional data includes at least one of:
a time of day the estimated time of arrival is determined;
a day of a month the estimated time of arrival is determined;
a day of a year the estimated time of arrival is determined;
a minute of an hour the estimated time of arrival is determined;
a weather pattern;
order volume associated with the store;
a number of customers associated with a location of the store;
wait time associated with the store;
order throughput data associated with the store; or
a direction the requesting entity is relative to the store.

5. The system of claim 1, wherein the location data is first location data at a first time and the estimated time of arrival is a first estimated time of arrival determined at the first time, the operations further comprising:
receiving, at a second time after the first time, second location data from the user computing device;
inputting, based on receiving the second location data from the user computing device, the pickup order, the second location data, and the additional data into the machine-learning model;
receiving, from the machine-learning model and based at least in part on the pickup order, the second location data, and the additional data, a second estimated time of arrival of the pickup entity to the polygonal area of the plurality of polygonal areas associated with the pickup location intent; and
sending, to the computing device associated with the store, the second estimated time of arrival of the pickup entity to arrive at the polygonal area of the plurality of polygonal areas.

6. The system of claim 1, wherein the machine-learning model includes at least one of a random decision forest model or a deep neural network.

7. A method, implemented at least in part by one or more computing devices, the method comprising:
receiving, from a merchant associated with a store, map data representing a plurality of polygonal areas proximate the store;
receiving a pickup order indicating at least one good or service and a pickup location intent;
associating the pickup order with a user computing device associated with a customer;
receiving location data from the user computing device;
determining additional data associated with the user computing device;
refraining from inputting the pickup order, the location data, the pickup location intent, and the additional data into a machine-learning model in response to determining that a distance between the user computing device and the pickup location intent is above a threshold distance;
inputting the pickup order, the location data, the pickup location intent, and the additional data into the machine-learning model in response to determining that the distance between the user computing device and the pickup location intent is below the threshold distance, wherein the machine-learning model is trained to determine a particular estimated time of arrival of a particular customer to a location of the store, wherein the machine-learning model is further trained based at least in part on ground truth data representing actual travel times between a first location of a training user computing device and a second location associated with the store and a ground truth intent representing a declared region to arrive at the store, wherein the declared region corresponds to an area of the plurality of polygonal areas associated with the store;
reducing a rate at which the particular estimated time of arrival is determined based at least in part on determining an accuracy with which the machine-learning model determines the particular estimated timed of arrival, wherein reducing the rate at which the particular estimated time of arrival is determined causes an overall processing of at least one processor of the one or more computers to be reduced;
receiving, from the machine-learning model and based at least in part on the pickup order, the location data, the pickup location intent, and the additional data, an estimated time of arrival of the customer to a polygonal area of the plurality of polygonal areas associated with the pickup location intent; and
sending, to a computing device associated with the store, the estimated time of arrival of the customer to arrive at the polygonal area of the plurality of polygonal areas.

8. The method of claim 7, wherein the polygonal area of the plurality of polygonal areas represents at least one of:
a premises boundary associated with the store;
a location of a drive-through associated with the store;
a location of a curbside-pickup location associated with the store;
a location of a parking lot associated with the store; or
a physical location within the store.

9. The method of claim 7, further comprising receiving, from the machine-learning model, confidence data associated with the estimated time of arrival.

10. The method of claim 7, wherein the additional data includes at least one of:
a time of day the estimated time of arrival is determined;
a day of a month the estimated time of arrival is determined;
a day of a year the estimated time of arrival is determined;
a minute of an hour the estimated time of arrival is determined;
a weather pattern;
order volume associated with the store;
a number of customers associated with the location of the store;

wait time associated with the store;
order throughput data associated with the store; or
a direction the customer is relative to the store.

11. The method of claim 7, wherein the location data is first location data at a first time and the estimated time of arrival is a first estimated time of arrival determined at the first time, the method further comprising:
receiving, at a second time after the first time, second location data from the user computing device;
inputting, based on receiving the second location data from the user computing device, the pickup order, the second location data, and the additional data into the machine-learning model;
receiving, from the machine-learning model and based at least in part on the pickup order, the second location data, and the additional data, a second estimated time of arrival of the customer to the polygonal area of the plurality of polygonal areas associated with the pickup location intent; and
sending, to a computing device associated with the store, the second estimated time of arrival of the customer to arrive at the polygonal area of the plurality of polygonal areas.

12. The method of claim 7, wherein the machine-learning model includes at least one of a random decision forest model or a deep neural network.

13. One or more non-transitory computer-readable media storing computer executable instructions that, when executed, cause one or more processors to perform operations comprising:
receiving, from a merchant associated with a store, map data representing a plurality of polygonal areas proximate the store;
receiving a pickup order indicating at least one good or service and a pickup location intent;
associating the pickup order with a user computing device associated with a customer;
receiving location data from the user computing device;
determining additional data associated with the user computing device;
refraining from inputting the pickup order, the location data, the pickup location intent, and the additional data into a machine-learning model in response to determining that a distance between the user computing device and the pickup location intent is above a threshold distance;
inputting the pickup order, the location data, the pickup location intent, and the additional data into the machine-learning model in response to determining that the distance between the user computing device and the pickup location intent is below the threshold distance, wherein the machine-learning model is trained to determine a particular estimated time of arrival of a particular customer to a location of the store, wherein the machine-learning model is further trained based at least in part on ground truth data representing actual travel times between a first location of a training user computing device and a second location associated with the store and a ground truth intent representing a declared region to arrive at the store, wherein the declared region corresponds to an area of the plurality of polygonal areas associated with the store;
reducing a rate at which the particular estimated time of arrival is determined based at least in part on determining an accuracy with which the machine-learning model determines the particular estimated timed of arrival, wherein reducing the rate at which the particular estimated time of arrival is determined causes an overall processing of the one or more processors to be reduced;
receiving, from the machine-learning model and based at least in part on the pickup order, the location data, and the additional data, an estimated time of arrival of the customer to a polygonal area of the plurality of polygonal areas associated with the pickup location intent; and
sending, to a computing device associated with the store, the estimated time of arrival of the customer to arrive at the polygonal area of the plurality of polygonal areas.

14. The one or more non-transitory computer-readable media of claim 13, wherein the polygonal area of the plurality of polygonal areas represents at least one of:
a premises boundary associated with the store;
a location of a drive-through associated with the store;
a location of a curbside-pickup location associated with the store;
a location of a parking lot associated with the store; or
a physical location within the store.

15. The one or more non-transitory computer-readable media of claim 13, the operations further comprising receiving, from the machine-learning model, confidence data associated with the estimated time of arrival.

16. The one or more non-transitory computer-readable media of claim 13, wherein the additional data includes at least one of:
a time of day the estimated time of arrival is determined;
a day of a month the estimated time of arrival is determined;
a day of a year the estimated time of arrival is determined;
a minute of an hour the estimated time of arrival is determined;
a weather pattern;
order volume associated with the store;
a number of customers associated with the location of the store;
wait time associated with the store;
order throughput data associated with the store; or
a direction the customer is relative to the store.

17. The one or more non-transitory computer-readable media of claim 13, wherein the location data is first location data at a first time and the estimated time of arrival is a first estimated time of arrival determined at the first time, the operations further comprising:
receiving, at a second time after the first time, second location data from the user computing device;
inputting, based on receiving the second location data from the user computing device, the pickup order, the second location data, and the additional data into the machine-learning model;
receiving, from the machine-learning model and based at least in part on the pickup order, the second location data, and the additional data, a second estimated time of arrival of the customer to the polygonal area of the plurality of polygonal areas associated with the pickup location intent; and
sending, to the computing device associated with the store, the second estimated time of arrival of the customer to arrive at the polygonal area of the plurality of polygonal areas.

18. The system of claim 1, wherein the declared region is received from the training user computing device.

19. The system of claim 1, wherein the machine-learning model is retrained based at least in part on at least one of:
   a frequency of orders placed at the store;
   a number of customers at the store;
   a number of requests made to the machine-learning model; or
   a difference between outputs from the machine-learning model and actual times of arrival.

20. The system of claim 1, the operations further comprising:
   updating an order processing queue based at least in part on the estimated time of arrival received from the machine-learning model.

* * * * *